United States Patent
Vidal et al.

(10) Patent No.: US 10,670,447 B2
(45) Date of Patent: Jun. 2, 2020

(54) METHOD FOR OBTAINING THE ABSORPTION POSITION, MASS AND RIGIDITY OF A PARTICLE

(71) Applicants: NANODREAMS, S.L., Bilbao (Vizcaya) (ES); CONSEJO SUPERIOR DE INVESTIGACIONES CIENTIFICAS, Madrid (ES)

(72) Inventors: Oscar Malvar Vidal, Madrid (ES); Jose Jaime Ruz Martinez, Madrid (ES); Priscila Monteiro Kosaka, Madrid (ES); Montserrat Calleja Gomez, Madrid (ES); Francisco Javier Tamayo De Miguel, Madrid (ES)

(73) Assignees: NANODREAMS, S.L. (ES); CONSEJO SUPERIOR DE INVESTIGACIONES CIENTIFICAS (ES)

( * ) Notice: Subject to any disclaimer, the term of this patent is extended or adjusted under 35 U.S.C. 154(b) by 16 days.

(21) Appl. No.: 16/093,088

(22) PCT Filed: Feb. 22, 2017

(86) PCT No.: PCT/ES2017/070098
§ 371 (c)(1),
(2) Date: Oct. 11, 2018

(87) PCT Pub. No.: WO2017/178672
PCT Pub. Date: Oct. 19, 2017

(65) Prior Publication Data
US 2019/0162580 A1 May 30, 2019

(30) Foreign Application Priority Data
Apr. 11, 2016 (ES) .................................. 201630443

(51) Int. Cl.
*G01G 3/16* (2006.01)
*H01J 49/26* (2006.01)
(Continued)

(52) U.S. Cl.
CPC .......... *G01G 3/16* (2013.01); *G01N 15/1056* (2013.01); *H01J 49/0036* (2013.01); *H01J 49/26* (2013.01);
(Continued)

(58) Field of Classification Search
CPC ................ G01G 3/16; G01N 15/1056; G01N 2015/0038; G01N 2015/1043;
(Continued)

(56) References Cited

U.S. PATENT DOCUMENTS

| 2012/0305760 A1 | 12/2012 | Blick et al. |
| 2014/0156224 A1 | 6/2014 | Roukes et al. |
| 2014/0244180 A1* | 8/2014 | Roukes .................... G01N 5/02 702/19 |

OTHER PUBLICATIONS

International Search Report, PCT/PCT/ES2017/070098, 3 pages, dated Jun. 6, 2017.
(Continued)

*Primary Examiner* — Catherine T. Rastovski
(74) *Attorney, Agent, or Firm* — Rao DeBoer Osterrieder, PLLC; John M. DeBoer

(57) ABSTRACT

A method for obtaining the absorption position, mass and rigidity of a particle deposited on the surface of a resonator based on the relative change in the resonance frequency of said resonator in 3 or 4 flexural vibration modes. The rigidity of the particles is of great interest in the study of cells and other biological compounds that change state without significantly changing the mass.

12 Claims, 4 Drawing Sheets

(51) Int. Cl.
  *G01N 15/10* (2006.01)
  *H01J 49/00* (2006.01)
  *G01N 15/00* (2006.01)
(52) U.S. Cl.
  CPC ............... *G01N 2015/0038* (2013.01); *G01N 2015/1043* (2013.01)
(58) Field of Classification Search
  CPC ... G01N 2015/0065; G01N 2015/0073; G01N 2015/008; G01N 2015/0088; G01N 15/1484; H01J 49/26; H01J 49/0036
  See application file for complete search history.

(56) References Cited

OTHER PUBLICATIONS

Written Opinion dated Jun. 6, 2017 for Intl App No. PCT/ES2017/070098 (6 pages).

\* cited by examiner

METHOD FOR OBTAINING THE ABSORPTION POSITION, MASS AND RIGIDITY OF A PARTICLE

FIELD OF THE INVENTION

The present invention relates to mass spectrometry, in particular to the use of micro-cantilevers or bridges and their different vibration modes for obtaining parameters of interest, such as mass.

BACKGROUND OF THE INVENTION

Mass spectrometry (MS) very accurately measures the mass-to-charge ratio in molecular species between 100 Da and 100 kDa. However, classic methods do not offer sufficient efficiency with greater particle masses, such as cells, bacteria or viruses. New nanoelectromechanical systems (NEMS) such as cantilevers or bridges enable the mass of intact objects greater than 100 kDa to be measured, which means that these structures are considered especially appropriate for studying biological complexes and nanoparticles. In nanoelectromechanical systems mass spectrometry, the sample is introduced by means of an electrospray ionization (ESI) system and the resulting ions are guided by means of an electrostatic system towards a high vacuum chamber (<; $10^{-5}$ Torr) where the resonator is located. Alternatively, matrix-assisted laser desorption/ionization (MALDI) may be used to carry the sample to the resonator. As the sample is absorbed by the resonator, sudden changes take place in the resonance frequency thereof, changes that are proportional to the mass of said particle with a proportionality constant that depends on the absorption position. Given that resonance is independent of the charge of the particle, the analysis of the data is simplified. The deconvolution of the absorption position throughout the NEMS and of the mass requires simultaneous measurement of at least two vibration modes, as proposed by Dohn et al. in "Mass and position determination of attached particles on cantilever based mass sensors", *Review of Scientific Instruments* 78, 103303, 2007) and is described in patent application US2014/0156224. However, these methods do not enable the rigidity to be measured, which is a parameter that has been ignored to date as it is considered to have no influence when calculating mass.

DESCRIPTION OF THE INVENTION

The present invention overcomes the technical prejudice described above and goes a step further in calculating parameters of interest by including the rigidity of particles, which is of great interest in the study of cells and other biological compounds that change state without significantly changing the mass (for example, healthy cells vs. cancer cells).

As such, the invention consists of a method for obtaining the absorption position, mass and rigidity of a particle deposited on the surface of a nanoelectromechanical resonator (cantilever or bridge) based on the changes in frequency of 3 or 4 flexural vibration modes. The particles may be inorganic, virus, bacteria, protein or cell particles.

BRIEF DESCRIPTION OF THE FIGURES

In order to assist in a better understanding of the characteristics of the invention according to a preferred exemplary embodiment thereof and to complement this description, the following figures are attached constituting an integral part of the same, which, by way of illustration and not limitation, represent the following.

of the particles.

DETAILED DESCRIPTION OF THE INVENTION

The method of the invention enables the absorption position $\xi_0$, the mass term $$\Delta_m = \frac{1}{2} \frac{m_a}{m_c}$$

and the rigidity term $$\Delta_a = \frac{1}{2} \frac{V_c E_a}{V_c E_c} \chi_a$$

of a particle deposited on the surface of a NEMS to be obtained based on the measurement of the changes in frequency of 3 or 4 flexural vibration modes, where m is the mass, V is the volume, E is the Young module, $\chi_e$ is the number related to the form of adsorbate and how the adsorbate adheres to the resonator and the subscripts a and c refer to the adsorbate and the resonator respectively. Therefore, knowing the properties of the resonator, the mass $m_a$ and the effective rigidity $V_a E_c \chi_e$ are obtained. This method enables the mass of adsorbates to be calculated, for which the rigidity is important, with greater accuracy.

Figure 1:
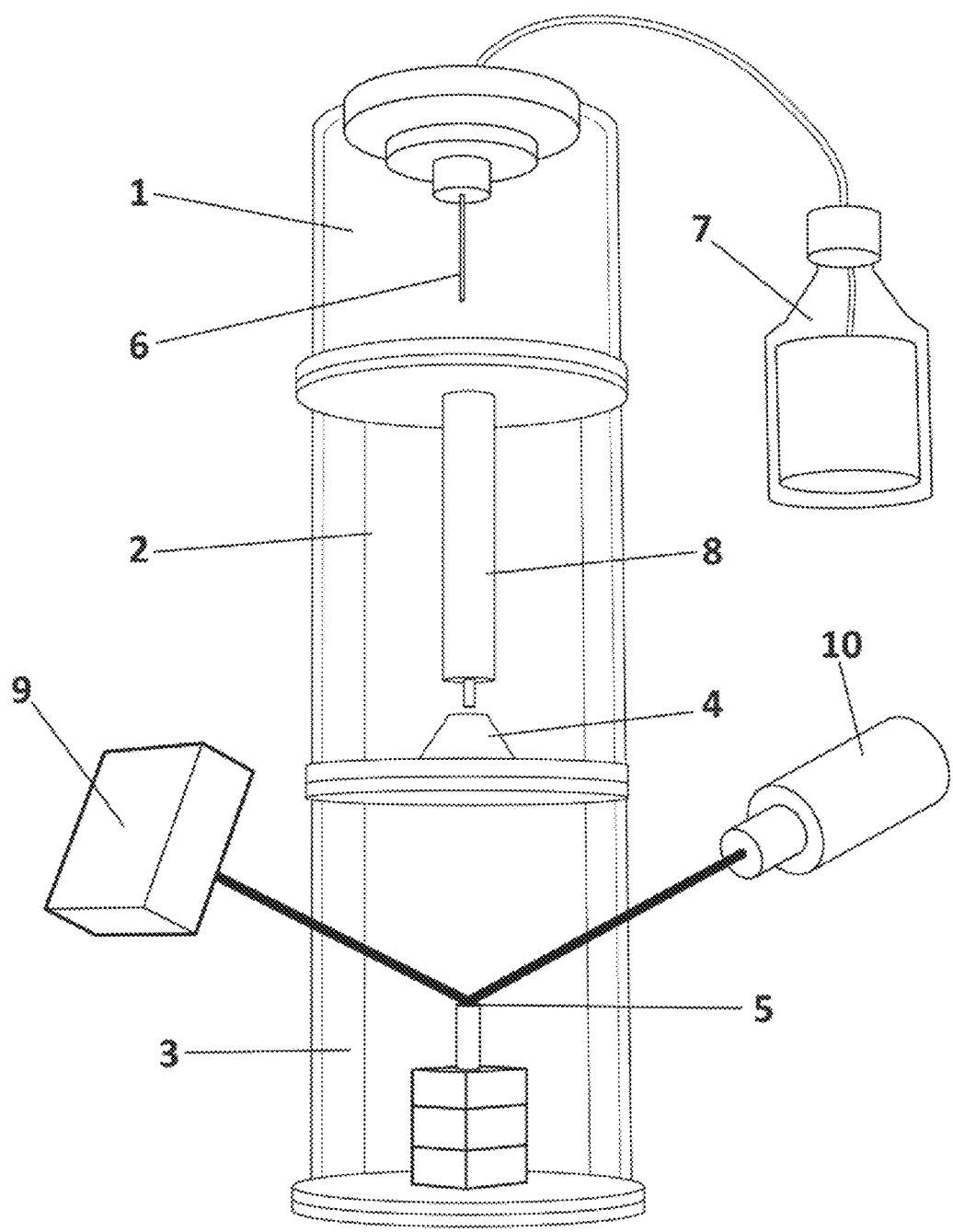
FIG. 1 is a diagram of a mass spectrometry system that may be used to carry out the method of the invention.
Figure 2:
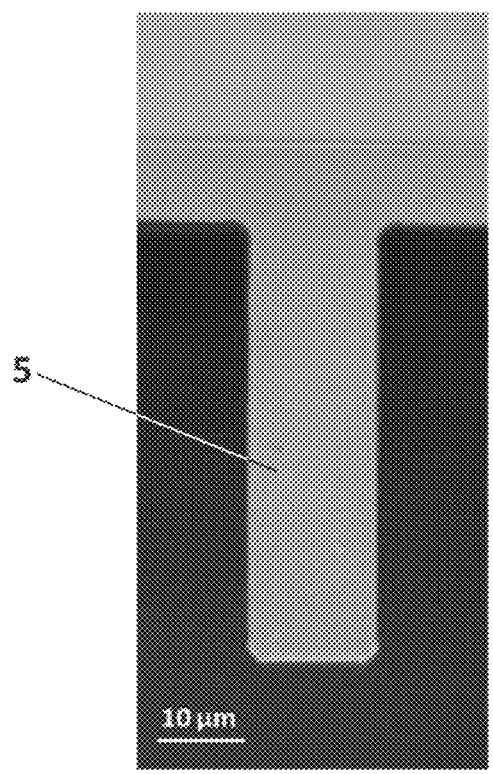
FIG. 2 shows the micro-cantilever in greater detail.
Figure 3:
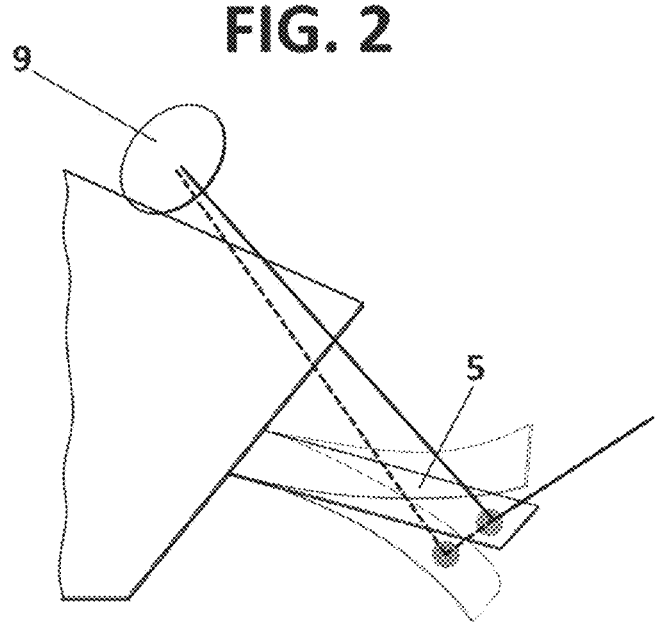
FIG. 3 is a schematic drawing of the beam deflection technique used to measure the resonance frequencies.

The mass spectrometer (MS) used may be seen in FIG. 1. The MS is made up of three differentiated vacuum chambers. The first chamber (1) is at atmospheric pressure and connected to the second by means of a hot capillary (8). The second chamber (2) is at 10 mbar and connected to the third by means of a skimmer and a microhole (100 μm) (4). The third chamber is at 0.1 mbar and contains the nanoelectromechanical resonator (5), which may be a cantilever or bridge. In the section at atmospheric pressure there is an electrospray ionization system responsible for sending the sample to the sensors. The ESI is made up of a bottle (7) with the dissolution and particles (inorganic, viral, etc.) of interest in suspension and a polyether ether ketone (PEEK) capillary (6). The dissolution is sent to the end of the capillary increasing the pressure in the bottle. When the first drop reaches the end of the capillary, a high voltage (3-5 kV) is applied, generating the known Taylor cone. A micro-jet ejects from the point of the cone from which small micro-droplets emerge that are positively charged (if the high voltage is positive, and negative if the high voltage is negative), which contain the dissolution and particles of interest. The micro-droplets generated in the first chamber (1) are sent to the second chamber (next differential vacuum) (2) where there is the hot capillary (8). The inner diameter of the hot capillary is between 400 and 500 µm and the temperature thereof is fixed between 150 and 300°, which favours the evaporation of the dissolution and prevents the particles from sticking to the walls by means of thermal agitation. The positively charged droplets lose part of their mass but not their charge, which means that these are progressively divided into smaller drops. The breaking point of a droplet into daughter droplets is caused when the Rayleigh criterion is reached, which is when the surface tension of the liquid and the repulsion caused by the positive charges (or negative in the case that the high voltage is negative) are in equilibrium. Lastly, the dissolution evaporates completely, leaving only the particles of interest. The particles enter the third chamber (3), or third differential vacuum, through a hole with a diameter of 100 µm. The nanoelectromechanical resonator (5) is in the third vacuum differential. In a particular implementation, the resonator is a bridge or cantilever as shown in FIG. 2. The third chamber (3) has two optical windows that enable the natural frequency of the resonator oscillation to be measured using the beam deflection method (FIG. 3). The laser (10) focuses on the resonator in the area where the product of the slopes of the vibration modes used is at a maximum by means of micro-positioners XYZ and the beam reflected is collected by a photodetector (9). The cantilever is excited by a piezoelectric element. When a particle reaches the surface of the resonator, there is a change in the frequency corresponding to each vibration mode. Based on the relative frequency changes, the values of $\xi_0$, $\Delta_m$ and $\Delta_s$ are found by numerical calculation, which maximise the probability density function.

$$JPDF(\hat{\Omega}) = \frac{e^{-\frac{(\hat{\Omega}-M)\Sigma^{-1}(\hat{\Omega}-M)^T}{2}}}{(2\pi)^{N/2}\sqrt{|\Sigma|}}$$

The change in vibration frequency may be measured in several ways. In a preferred example, a LASER is focused on the resonator in the area where the product of the slope of the vibration modes used is maximised. The reflected beam is detected by a 4 quadrant photo detector (or similar photodetector), which is known in the state of the art of beam deflection. Then, the signal from the photodetector is pre-amplified and sent to an amplifier, preferably of the Lock-in type (a type of amplifier that can extract signals from incredibly noisy media). A piezoelectric material located below the resonator is used to carry out a sweep around the frequencies of interest in order to obtain the characteristic frequencies and phases of the resonator. The frequencies and phases obtained in the point about are used to configure the phase lock loops (PLLs), which monitor the corresponding frequencies over time. When a particle reaches the surface of the resonator, there is a change in the resonance frequencies $\Delta f_n$. This change is registered by the PLLs. The changes in frequency are stored and, based on the same, the changes in relative frequency are calculated using the following formula:

$$\mu_n = \frac{\Delta f_n}{f_{0n}} = \frac{f_n - f_{0n}}{f_{0n}}$$

Where $f_n$ is the average of the frequency over the time corresponding to the mode n after absorption and $f_{0n}$ is the average of the frequency over the time corresponding to the mode n before absorption. In this way, the relative changes of each vibration mode are obtained depending on the time and the standard deviation thereof.

In order to obtain the absorption position, mass and rigidity of the adsorbed particle based on these data, which have been stored, the following steps must be carried out:

1. The standard deviation of the relative frequency change of each mode $\sigma_n$ and the values of the relative frequency change corresponding to adsorption $\mu_n$ is calculated based on the data stored.

2. The following probability density function is formed based on the values of $\mu_n$ and $\sigma_n$ for the N modes used (N=3 or N=4) which depend on three variables $\xi_0$, $\Delta_m$ and $\Delta_s$;

$$JPDF(\hat{\Omega}) = \frac{e^{-\frac{(\hat{\Omega}-M)\Sigma^{-1}(\hat{\Omega}-M)^T}{2}}}{(2\pi)^{N/2}\sqrt{|\Sigma|}}$$

Where $\hat{\Omega}=(\Omega_1, \Omega_2, \ldots, \Omega_N)$, with $\Omega_a$ given by:

$$\Omega_n = -\Delta_m \psi_n(\xi_0)^2 + \Delta_s \frac{1}{\beta_n^4}\left(\frac{d^2\psi_n(\xi_0)}{d\xi^2}\right)^2$$

Where $\psi_n$ and $\beta_n$ are the type of vibration and the eigenvalue of the n-th mode respectively,
M−($\mu_1, \mu_2, \ldots, \mu_N$) and $\Sigma$ is the covariance matrix given by:

$$\Sigma = \begin{pmatrix} \sigma_1^2 & \sigma_1\sigma_2\rho_{12} & \cdots & \sigma_1\sigma_N\rho_{1N} \\ \sigma_1\sigma_2\rho_{12} & \sigma_2^2 & \cdots & \vdots \\ \vdots & \vdots & \ddots & \vdots \\ \sigma_1\sigma_N\rho_{1N} & \cdots & \cdots & \sigma_N^2 \end{pmatrix}$$

Where $\rho_{ij}$ is the correlation between modes i and j.

3. The values of $\xi_0$, $\Lambda_m$ and $\Lambda_s$ that maximise the probability density function JPDF($\hat{\Omega}$) is found. At this point, a person skilled in the art will recognise that there are several methods for obtaining the values of $\xi_0$, $\Lambda_m$ and $\Lambda_s$ that maximise the probability density function JPDF($\hat{\Omega}$). Two of them are proposed below.

First Exemplary Embodiment

The following functional is formed:

$$F=(\hat{\Omega}(\Lambda_m,\Lambda_s,\xi_0)-M)\Sigma^{-1}(\hat{\Omega}(\Lambda_m,\Lambda_s,\xi_0)-M)^T$$

Functional F is numerically minimised using any existing optimisation routine, for example Newton's method.

Second Exemplary Embodiment

The following functional is formed:

$$G(\xi_0, \epsilon) = \sum_{n=1}^{N} \left( C_n(\xi_0, \epsilon) - \frac{\mu_n}{\sqrt{\sum_{m=1}^{N} \mu_m^2}} \right)^2$$

Where $$\epsilon = \frac{\Delta_s}{\Delta_m}$$

and $C_n(\xi_0, \epsilon)$ are given by $$C_n = \frac{\Omega_n(\xi_0, \epsilon)}{\sqrt{\sum_{m=1}^{N} \Omega_m(\xi_0, \epsilon)^2}}$$

Where $\Omega_n(\xi_0, \epsilon)$ is given by:

$$\Omega_n(\xi_0, \epsilon) = \Delta_m \left( -\psi_n(\xi_0)^2 + \epsilon \frac{1}{\beta_n^4} \left( \frac{d^2 \psi_n(\xi_0)}{d\xi^2} \right)^2 \right)$$

The values of $\xi_0$ and $\epsilon$ that minimise the functional G are found using any existing numerical routine (again, Newton's method can be used).

The following functional is formed:

$$F = (\hat{\Omega}(\Delta_m, \epsilon, \xi_0) - M)\Sigma^{-1}(\hat{\Omega}(\Delta_m, \epsilon, \xi_0) - M)^T$$

The previously obtained values of $\xi_0$ and $\epsilon$ are used and are substituted in the functional F.

The value of that minimised the functional F is found. Therefore, $\xi_0$, $\Delta_m$ and $\Delta_s = \epsilon \Delta_m$ are perfectly determined. This method has computational advantages with respect to the first due to the fact that the function to be minimised has two variables instead of three. As well as these computational advantages, this method is also more accurate than the first.

Examples

Figure 4:
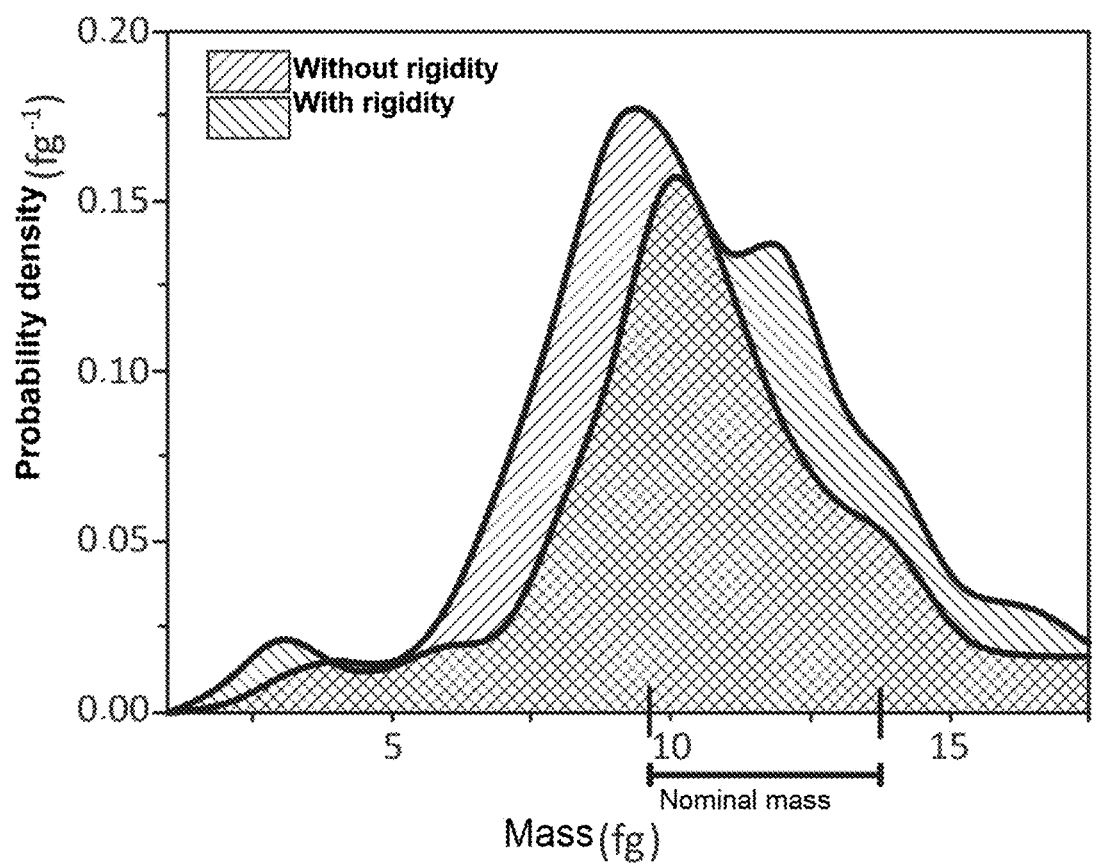
FIG. 4 is a graph showing the mass of particles taking into account the rigidity compared to the mass calculated without taking into account the rigidity and the mass provided by the manufacturer (continuous line).
Figure 5:
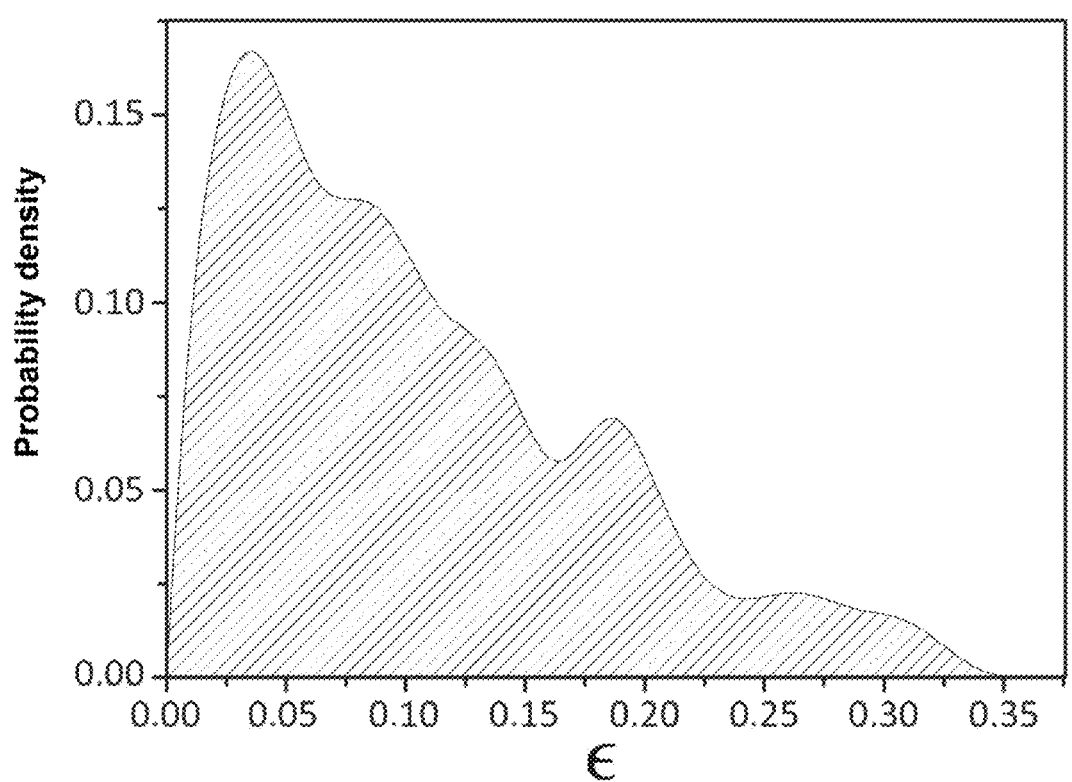
FIG. 5 is a graph of the ration between the rigidity term and the mass term $$\left(\epsilon = \frac{\Delta_s}{\Delta_m} = \frac{\rho_c \chi_e E_a}{E_c \rho_a}\right)$$

FIG. 4 is obtained by following the second method for gold nanoparticles of 100 nm with a nominal diameter. 174 absorptions of said nanoparticles were measured on the surface of a cantilever. Frequency changes in the first 3 flexural modes were stored and the second method described above was used to extract the mass, position and rigidity of the gold nanoparticles. A graph of the mass (FIG. 4) and another for $\epsilon$ (FIG. 5) was prepared using this data. The graph of the mass also shows the distribution provided by the manufacturer (Sigma Aldrich, segment with continuous line) and the distribution of the mass obtained without taking into account the rigidity (method described in the state of the art) where a displacement in the distribution of the mass towards smaller values when rigidity is not taken into account may be clearly seen. The graph also shows that the data that include the rigidity effect fit better with the distribution of the mass provided by the manufacturer, such that the method of the invention presents the additional advantage of improving the measurements of the mass parameter.

Based on the definitions provided above for $\Delta_m$ and $\Delta_s$, the parameter $\epsilon$ may be expressed as:

$$\epsilon = \frac{\Delta_s}{\Delta_m} = \frac{\rho_c \chi_e E_a}{E_c \rho_a}$$

Where $\epsilon$ is a direct measurement and is proportional to the rigidity of the adsorbate.

The invention claimed:

1. A method for obtaining the absorption position, mass and rigidity of a particle deposited on the surface of a resonator of a mass spectrometer based on the relative change in the resonance frequency of said resonator in N=3 or N=4 flexural vibration modes, where said method comprises the following steps:
    a. the standard deviation of the relative frequency change of each mode $\sigma_n$ and the values of the relative frequency change corresponding to adsorption $\mu_n$ is calculated,
    b. the following probability density function is formed $$JPDF(\hat{\Omega}) = \frac{e^{-\frac{(\hat{\Omega}-M)\Sigma^{-1}(\hat{\Omega}-M)^T}{2}}}{(2\pi)^{N/2}\sqrt{|\Sigma|}}$$

where $\hat{\Omega} = (\Omega_1, \Omega_2, \ldots, \Omega_N)$, with $\Omega_n$ given by:

$$\Omega_n = -\Delta_m \psi_n(\xi_0)^2 + \Delta_s \frac{1}{\beta_n^4} \left( \frac{d^2 \psi_n(\xi_0)}{d\xi^2} \right)^2$$

where $\psi_n$ and $\beta_n$ are the type of vibration and the eigenvalue of the n-th mode, respectively, $M = (\mu_1, \mu_2, \ldots, \mu_N)$ and $\Sigma$ is the covariance matrix given by:

$$\Sigma = \begin{pmatrix} \sigma_1^2 & \sigma_1 \sigma_2 \rho_{12} & \cdots & \sigma_1 \sigma_N \rho_{1N} \\ \sigma_1 \sigma_2 \rho_{12} & \sigma_2^2 & \cdots & \vdots \\ \vdots & \vdots & \ddots & \vdots \\ \sigma_1 \sigma_N \rho_{1N} & \cdots & \cdots & \sigma_N^2 \end{pmatrix}$$

where $\rho_{ij}$ is the correlation between modes i and j;
    c. the values of the absorption position $\xi_0$, the mass term $\Delta_m$ and the rigidity term $\Delta_s$ that maximise the probability density function are calculated.

2. The method of claim 1, wherein the particles are inorganic, virus, bacteria, protein or cell particles.

3. The method according to claim 1, wherein, in order to maximise the probability density function $JPDF(\hat{\Omega})$, the following functional is minimised:

$$F = (\hat{\Omega}(\Delta_m, \epsilon, \xi_0) - M)\Sigma^{-1}(\hat{\Omega}(\Delta_m, \epsilon, \xi_0) - M)^T \text{ where}$$

$$\epsilon = \frac{\Delta_s}{\Delta_m}.$$

4. The method of claim 3, wherein the particles are inorganic, virus, bacteria, protein or cell particles.

5. The method according to claim 1, wherein, in order to maximise the probability density function JPDF($\hat{\Omega}$), the following functional is formed:

$$G(\xi_0, \epsilon) = \sum_{n=1}^{N}\left(C_n(\xi_0, \epsilon) - \frac{\mu_n}{\sqrt{\sum_{m=1}^{N}\mu_m^2}}\right)^2$$

where $$\epsilon = \frac{\Delta_g}{\Delta_m}$$

and $C_n(\xi_0, \epsilon)$ are given by:

$$C_n = \frac{\Omega_n(\xi_0, \epsilon)}{\sqrt{\sum_{m=1}^{N}\Omega_m(\xi_0, \epsilon)^2}},$$

where $\Omega_n(\xi_0, \epsilon)$ is given by:

$$\Omega_n(\xi_0, \epsilon) = \Delta_m\left(-\psi_n(\xi_0)^2 + \epsilon\frac{1}{\beta_n^4}\left(\frac{d^2\psi_n(\xi_0)}{d\xi^2}\right)^2\right),$$

the values of $\xi_0$ and $\epsilon$ that minimise the functional G are found using any existing numerical routine,
the following functional is formed:

$$F = (\hat{\Omega}(\Delta_m, \epsilon, \xi_0) - M)\Sigma^{-1}(\hat{\Omega}(\Delta_m, \epsilon, \xi_0) - M)^T$$

the previously obtained values of $\xi_0$ and $\epsilon$ are used, they are substituted in the functional F,
the value of $\Delta_m$ that minimises the functional F is found.

6. The method of claim 5, wherein the particles are inorganic, virus, bacteria, protein or cell particles.

7. The method according to claim 1, wherein the resonator is a cantilever or a bridge.

8. The method according to claim 7, wherein, in order to maximise the probability density function JPDF($\hat{\Omega}$), the following functional is minimised:

$$F = (\hat{\Omega}(\Delta_m, \epsilon, \xi_0) - M)\Sigma^{-1}(\hat{\Omega}(\Delta_m, \epsilon, \xi_0) - M)^T \text{ where}$$
$$\epsilon = \Delta s/\Delta m$$

9. The method of claim 8, wherein the particles are inorganic, virus, bacteria, protein or cell particles.

10. The method according to claim 7, wherein, in order to maximise the probability density function JPDF($\hat{\Omega}$), the following functional is formed:

$$G(\xi_0, \epsilon) = \sum_{n=1}^{N}\left(C_n(\xi_0, \epsilon) - \frac{\mu_n}{\sqrt{\sum_{m=1}^{N}\mu_m^2}}\right)^2$$

where $$\epsilon = \frac{\Delta_g}{\Delta_m}$$

and $C_n(\xi_0, \epsilon)$ are given by:

$$C_n = \frac{\Omega_n(\xi_0, \epsilon)}{\sqrt{\sum_{m=1}^{N}\Omega_m(\xi_0, \epsilon)^2}},$$

where $\Omega_n(\xi_0, \epsilon)$ is given by:

$$\Omega_n(\xi_0, \epsilon) = \Delta_m\left(-\psi_n(\xi_0)^2 + \epsilon\frac{1}{\beta_n^4}\left(\frac{d^2\psi_n(\xi_0)}{d\xi^2}\right)^2\right),$$

the values of $\xi_0$ and $\epsilon$ that minimise the functional G are found using any existing numerical routine,
the following functional is formed:

$$F = (\hat{\Omega}(\Delta_m, \epsilon, \xi_0) - M)\Sigma^{-1}(\hat{\Omega}(\Delta_m, \epsilon, \xi_0) - M)^T$$

the previously obtained values of $\xi_0$ and $\epsilon$ are used, they are substituted in the functional F, the value of $\Delta_m$ that minimises the functional F is found.

11. The method of claim 10, wherein the particles are inorganic, virus, bacteria, protein or cell particles.

12. The method of claim 7, wherein the particles are inorganic, virus, bacteria, protein or cell particles.

* * * * *